INVENTOR.
David E. Griswold
BY Baron & Thomas
Attorneys

INVENTOR.
David E. Griswold
BY
Baron + Thomas
Attorneys

June 3, 1958

D. E. GRISWOLD 2,837,241

LIQUID FLOW CONTROL MEANS FOR REFUELING
APPARATUS AND THE LIKE

Filed Aug. 20, 1952

INVENTOR.
David E. Griswold
BY
Baron + Thomas
Attorneys

INVENTOR.
David E. Griswold
BY
Bacon + Thomas
Attorneys

United States Patent Office 2,837,241
Patented June 3, 1958

2,837,241

LIQUID FLOW CONTROL MEANS FOR REFUELING APPARATUS AND THE LIKE

David E. Griswold, San Marino, Calif., assignor to Donald G. Griswold, Alhambra, Calif.

Application August 20, 1952, Serial No. 305,482

30 Claims. (Cl. 222—52)

The present invention relates generally to liquid flow control and distribution apparatus for use wherever it is desired to maintain a constant line discharge pressure.

The invention further relates to improvements in liquid flow control apparatus, and more particularly to valve means and automatic pressure-responsive control means for said valve means that will maintain a predetermined discharge pressure from a pipe line or the like irrespective of fluctuations in demand.

The present invention is particularly applicable to apparatus for distributing or dispensing liquid fuel, such as, gasoline, fuel oil, etc., although it will be obvious that the principles involved are equally applicable to the handling of all liquids.

By way of illustration, and not limitation, one phase of the invention is specifically illustrated and described hereinafter in connection with a gasoline dispensing system useful on tank trucks for refueling airplanes, aboard aircraft carriers for similar purposes, or in any stationary installation where a uniform delivery pressure is desired. One of the important attributes of the new system is that it embodies sensitive valve means and pressure responsive control means therefor which will maintain a predetermined constant pressure at the discharge end of a long pipe or hose line irrespective of line resistance, and notwithstanding the fact that the volume of discharging liquid may be varied by manipulation of the operator. Another feature of the system is that it includes means for evacuating the delivery line following a refueling operation.

The principal object of the invention is to provide a valve and automatic control means therefor which will compensate for line pressure losses due to friction and flow resistance produced by one or more elements connected in the line, so that the delivered pressure at the end of, or a given point in, the line will be maintained at a predetermined desired constant pressure, irrespective of variations in demand.

Another object of the invention is to provide a valve and control means therefor which is responsive to pressure differentials and/or multiple pressure points taken at selected intervals in a system or along the length of the pipe line.

Another object of the invention is to provide sensitive, pressure-responsive control means per se for a main valve for use wherever it is desired to have the main valve function quickly in response to the differential in any desired number of pressure conditions in a pipe line or system.

A more specific object of the invention is to provide a control device for a main valve which will be actuated in response to several different pressures that can be added together or subtracted from each other so that the ultimate flow will be controlled in accordance with the algebraic sum of all the pressures acting on the control means to effect opening or closing of the main valve.

Another object of the invention is to provide liquid flow control means including a valve and control means therefor which will cause the valve to automatically open to permit flow at full capacity, if necessary, or will throttle and modulate the flow to compensate for changes in flow rate through the pipe line while maintaining a constant discharge pressure from the line.

Still another object of the invention is to provide a by-pass valve and control means for said valve adapted to be associated with a pump for effecting by-passing of the pump in accordance with fluctuations in line demand, while maintaining a constant pressure at the end of, or any given point in, the line.

A further object of the invention is to provide pressure responsive control means for controlling a main valve, or a by-pass valve, wherein the control is operable in response to the difference between a set spring pressure, and the algebraic sum of the differential pressure across a restrictive orifice in the line and a pressure-sensing point in the line spaced from said orifice.

A more specific object of the invention is to provide liquid flow control means for use in a gasoline fueling or dispensing system, which will automatically maintain a constant hydraulic pressure at the discharge end or nozzle of a fueling hose irrespective of any change in the rate of flow through the nozzle.

Another object of the invention is to provide a gasoline dispensing system including means for evacuating gasoline from the delivery hose and returning it to a storage tank.

A further object of the invention is to provide a gasoline dispensing system including manually operable control means for simultaneously effecting opening of a pump by-passing valve, and actuation of an evacuator for withdrawing gasoline from all parts of the system beyond a given point on the discharge side of the pump.

A still further object of the invention is to provide a liquid flow control system adapted to be associated with a storage tank, and wherein means is provided for utilizing a single pump for pumping liquid out of the storage tank for delivery to a point of use, and for pumping liquid into the storage tank from a supply source to refill said tank.

Other features, objects and advantages of the invention will be apparent from the following description taken in conjunction with the accompanying drawings, in which.

Figure 1:
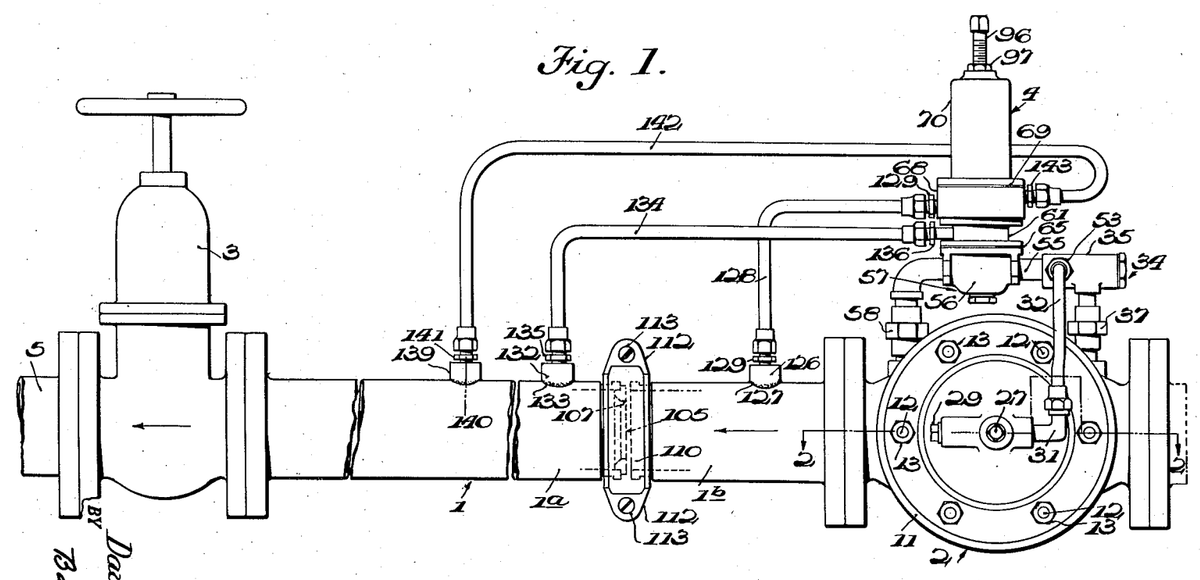
Fig. 1 is a view of a pipe line including a main valve and an automatic pressure differential operated pilot valve connected with the main valve and pipe line in accordance with the principles of the present invention.

Referring now to Fig. 1, the numeral 1 generally identifies a pipe line having a fluid pressure operable main valve 2 connected therewith for controlling the flow therethrough. A manually operable shut-off valve 3 is located adjacent the discharge end of said pipe line, remote from the main valve 2. An automatic pressure differential operated control means or pilot valve 4 is operatively connected with the pipe line 1 and with the main valve 2, and is constructed and arranged to maintain a predetermined constant unit pressure at the discharge end 5 of the pipe line, irrespective of fluctuations in demand or variations in the extent of opening of the valve 3. The details of construction of the control means 4, and its manner of connection with the pipe line 1 and with main valve 2, will be described later.

Figure 2:
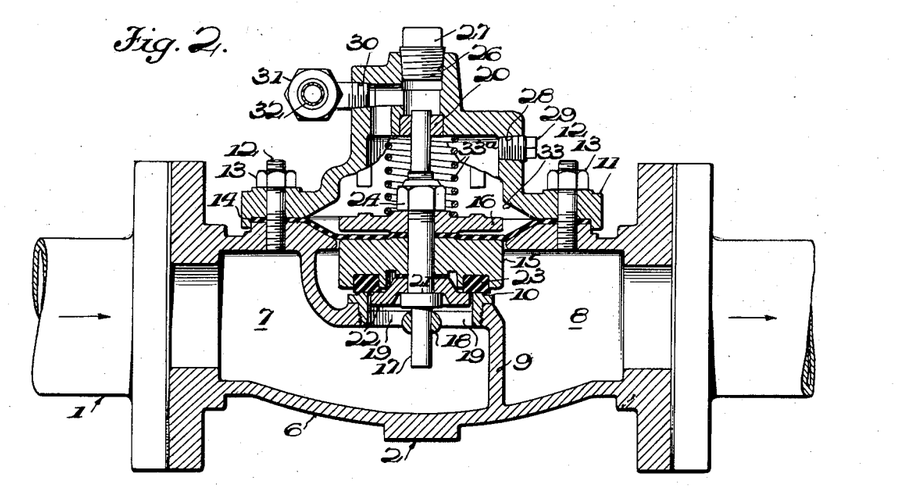
Fig. 2 is a longitudinal sectional view through the main valve taken on the line 2—2 of Fig. 1.

Referring now to Fig. 2, the main valve 2 comprises a body 6 provided with an inlet chamber 7 and an outlet chamber 8. A partition 9 in the valve body 6 separates said chambers, and serves as a support for a valve seat 10. A cover 11 is secured to the valve body 6 by means of a plurality of studs 12 and nuts 13, a flexible conventional diaphragm 14 being interposed between said valve body and cover. A diaphragm-supporting plate 15 is disposed in the body 6 below the diaphragm 14 and another supporting plate 16 is disposed in the cover 11 above said diaphragm. A valve stem 17 extends through the diaphragm 14 and its supporting plates 15 and 16 and is slideably mounted at its lower end in a guide 18 supported by arms 19 connected with the seat 10. The upper end of the stem 17 is guided in a bushing 20 mounted in the cover 11. The stem 17 has a shoulder 21 disposed above the guide 18, which serves as an abutment for a dished washer 22. The supporting plate 15 has an annular groove formed in the lower face thereof in which a sealing ring 23 is disposed and held in place by the outer marginal portion of the washer 22. The stem 17 is threaded in the region of the plate 16 and a self-locking nut 24 is threaded thereon to secure the diaphragm 14, supporting plates 15 and 16, washer 22, and sealing member 23 in assembled relation. The sealing ring 23 is cooperable with the seat 10 to control the flow of fluid through the main valve 2.

The cover 11 has a central threaded opening 26 above the stem 17 which is closed by a conventional pipe plug 27. A threaded opening 28 formed in a boss on the cover 11 is similarly closed by a plug 29. Another boss has a threaded opening 30 in which a conventional angle pipe fitting 31 is mounted. One end of a conduit 32 is connected to the fitting 31 for the purpose of conducting operating fluid to and from a diaphragm pressure chamber 33 formed within the cover 11 above the diaphragm 14, as will become apparent hereinafter. A compression spring 33a is disposed in the diaphragm chamber 33 between the cover 11 and the plate 16 and tends to urge the valve stem 17 downwardly to its valve closing position.

An orifice-equipped strainer 34 (Figs. 1, 5 and 6) comprises a housing 35 which has a threaded opening 36 connected by suitable pipe fittings 37 with the inlet chamber 7 of the main valve 2. The opening 36 communicates with a chamber 38 threaded at its outer end, as indicated at 39, to receive a hollow closure plug 40, a gasket 41 being interposed between the head of said plug and the adjacent end of the housing 35 to form a liquid-tight seal. The inner end of the plug 40 is reduced in diameter, as indicated at 42, and fits snugly in an opening 43 formed in a transverse partition 44. The plug 40 includes an intermediate portion provided with outwardly projecting ribs 45 and apertures 46 between said ribs communicating with a chamber 47 within said plug to permit the flow of liquid from the chamber 38 into the hollow portion of the plug 40. A fine mesh cylindrical screen 48 engages the ribs 46 and serves to prevent foreign matter from entering the chamber 47. A headed nozzle 49 having an orifice 50 is carried by the inner end 42 of the plug 40 and extends a substantial distance into the chamber 47 within said plug. The nozzle 49 is preferably brazed to the plug 40 to permanently unite the two. A gasket 51 forms a seal between the partition 44 and the adjacent face of the intermediate portion of the plug 40.

The strainer housing 35 has a chamber 52 in communication with the discharge end of the nozzle 49. A pipe fitting 53 (Fig. 6) is mounted in a threaded portion of the chamber 52 and has one end of the conduit 32 connected thereto, wherefrom it will be apparent that operating fluid under pressure can flow from the inlet chamber 7 of the main valve 2 through the fittings 37, into the chamber 38, thence through the screen 48 and openings 46 in the plug 40 into the chamber 47, then through the nozzle orifice 50 into the chamber 52, and then through the conduit 32 to the pressure chamber 33 in the cover 11 of said main valve, whereby to provide a constant supply of operating fluid under pressure from the upstream side of the pipe line for effecting closing or modulating action of the main valve 2 to thus control the flow of liquid therethrough. It will be understood that the rate of flow to the diaphragm chamber 33 is limited by the size of the orifice 50 to control the rate of closing of the valve 2.

The strainer housing 35 has a threaded opening 54 communicating with the chamber 52 in which one end of a pipe nipple 55 is mounted. The opposite end of the pipe nipple 55 is threaded into an inlet opening 55a (Fig. 4) formed in the body 56 of a valve 57 comprising an element of the pressure differential control 4. The body 56 has a threaded outlet opening 58a connected by suitable pipe fittings 58 with the outlet chamber 8 of the main valve 2. A partition 59 extending from the opening 55a separates the inlet and outlet openings 55a and 58a and serves as a support for an inverted valve seat 60. A cover 61 has a lower flange 62 secured to the valve body 56 by a plurality of studs 63 and nuts 64 mounted upon said studs; an annular gasket 65 being interposed between the adjacent faces of the body 56 and the cover 61 to form a liquid-tight seal therebetween. The cover 61 has a flange 66 at its upper end and a flexible diaphragm 67 overlies said flange. An intermediate section 68 overlies the diaphragm 67 and a similar diaphragm 69 overlies said intermediate section. A housing 70 having a flange 71 at its lower end engages the upper side of the diaphragm 69. A plurality of studs 72 is mounted in the flange 66 and extends through the diaphragm 67, intermediate section 68, diaphragm 69 and flange 71, and nuts 73 are mounted upon the studs 72 and secure the aforementioned parts in fluid-tight assembled relation. The housing 70 has an opening 70a serving to vent the interior of said housing to the outside atmosphere.

Figures 4, 5, 6:
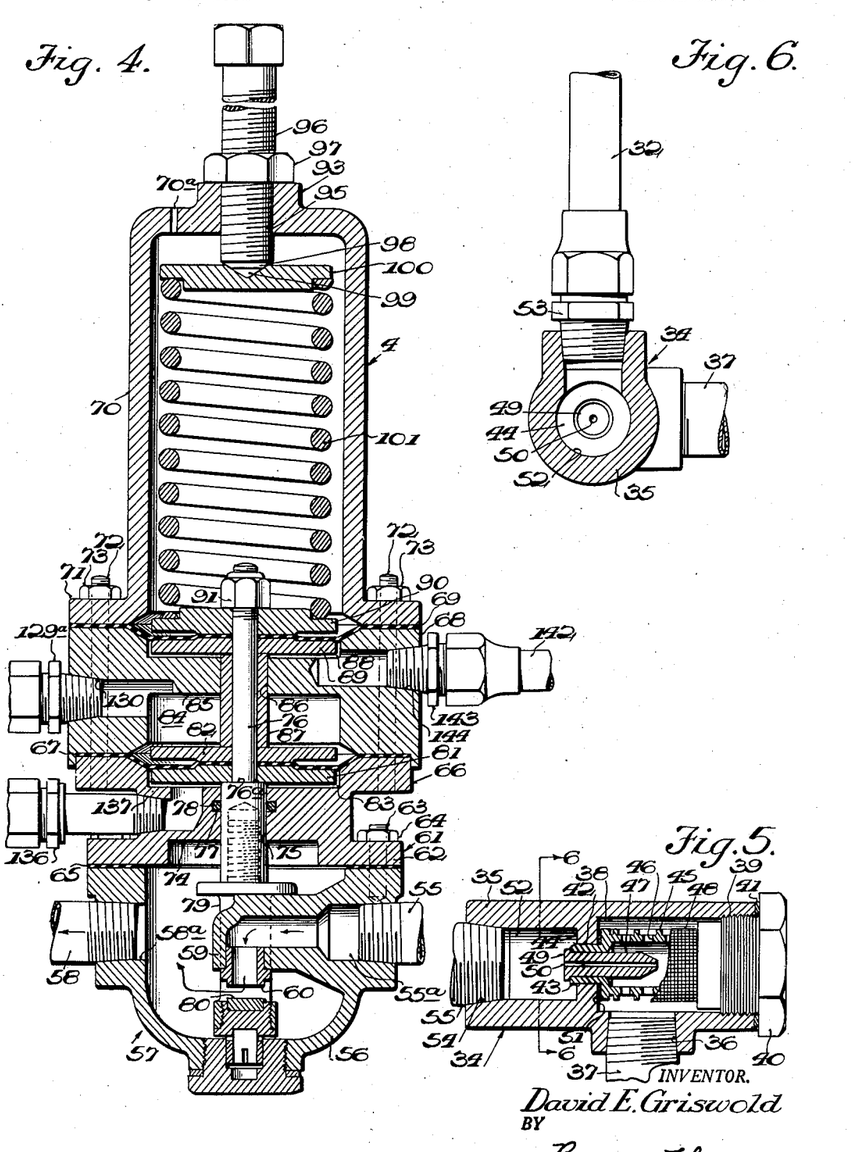
Fig. 4 is a vertical sectional view through the pressure differential operated pilot valve for controlling the main valve.
Fig. 5 is a horizontal sectional view through an orifice-equipped strainer, which is interposed between the inlet chamber of the main valve and the inlet side of the pilot valve.
Fig. 6 is a vertical sectional view through the strainer taken on the line 6—6 of Fig. 5.

The cover 61 has a transverse wall 74 provided with an opening 75 in which a valve stem 76 is slidably mounted. The wall 74 has a groove 77 in which an O-ring packing 78 is mounted to form a seal around the stem 76. A yoke 79 surrounds the inner end of the partition 59 and is carried by the lower end of the valve stem 76. The yoke 79 serves as a support for a closure assembly comprising a disc or washer 80 adapted to co-operate with the valve seat 60 to control the flow of fluid through the valve 57.

The valve stem 76 has a shoulder 76ᵃ disposed above the transverse wall 74 of the cover member 61 adapted to form an abutment for a diaphragm supporting plate 81 mounted upon said stem at the lower side of the diaphragm 67. A similar plate 82 is mounted upon the stem 76 above the diaphragm 67. The plate 81 is received in a chamber 83 formed in the cover 61 and the plate 82 is received in a chamber 84 formed in the intermediate member 68.

The intermediate member 68 has a transverse wall 85 which in part defines the chamber 84. The wall 85 has a central opening 86 in which a cylindrical sleeve 87 is slidably mounted. The sleever 87 surrounds the stem 76 and extends upwardly to a point above the wall 85 and into a chamber 88 formed in the intermediate member 68. The upper end of the sleeve 87 is engaged by a diaphragm-supporting plate 89 mounted upon the valve stem 76 and disposed below the diaphragm 69. A diaphragm-supporting plate 90 is also mounted upon the valve stem 76 and engages the upper side of the diaphragm 69. A self-locking nut 91 is mounted upon the upper threaded end of the valve stem 76 for securing the plate 81, diaphragm 67, plate 82, sleeve 87, plate 89 and diaphragm 69 and plate 90 in assembled relation with the valve stem 76. It will be observed that the use of the sleeve 87 makes it possible to greatly simplify the structure of the valve stem 76 since the sleeve itself serves as a spacer for maintaining the plates 82 and 89 spaced apart a predetermined distance and avoids the necessity of providing an additional shoulder on the stem for engagement by the plate 89.

The housing 70 has a boss 93 provided with a threaded opening 95, and an adjusting screw 96 is mounted in said opening. A jam nut 97 is mounted on the screw 96 to retain the same in adjusted position. The screw 96 projects into the housing 70 and its inner end is made conical as indicated at 98 so that it will seat in a complemental recess 99 formed in a centrally disposed disc 100. A compression spring 101 is disposed in the housing 70 between the plate 90 and the disc 100 and normally tends to urge the valve stem 76 and the closure member 80 carried thereby away from the seat 60, or in a valve opening direction.

Figure 3:
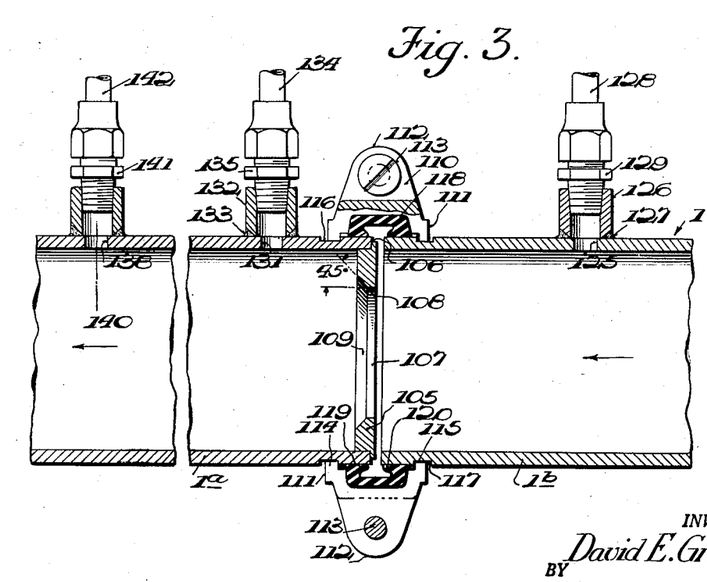
Fig. 3 is a sectional view of a fragmentary portion of the pipe line shown in Fig. 1, and particularly illustrating a preferred means for mounting an orifice plate in the pipe line together with means for conveniently connecting pressure conduits to said pipe line on opposite sides of the orifice plate.

Referring now more particularly to Fig. 3, the pipe line 1, on the discharge side of the main valve 2 comprises sections 1ᵃ and 1ᵇ having their adjacent ends spaced apart to receive an orifice disc or plate 105 therebetween. The plate 105 has a peripheral flange 106 projecting into the space between the adjacent ends of the pipe sections 1ᵃ and 1ᵇ and is provided with a central, circular orifice 107 having a cylindrical portion 108 and a portion 109 on the downstream side of the plate 105 flared on an angle of about 45°, as shown. The adjacent ends of the pipe sections 1ᵃ and 1ᵇ are connected together by a split coupling comprising two substantially semi-circular, arcuate, sections 110 and 111, which have flanges 112 secured together by screws 113. Each of the coupling sections 110 and 111 has internal ribs 114 and 115, which respectively project into grooves 116 and 117 located near the extremities of the pipe sections 1ᵃ and 1ᵇ, as shown. The coupling sections 110 and 111 are internally recessed to receive an annular rubber sealing ring 118, which is itself internally grooved or generally U-shaped in transverse cross-section to provide resilient legs or flanges 119 and 120 adapted to engage the outer periphery of the adjacent pipe sections 1ᵃ and 1ᵇ, respectively, to form a liquid-tight seal therewith. The split coupling thus provides a convenient method for mounting the orifice plate 105 in the pipe line 1 and eliminates the necessity for the usual heavy flange sections commonly employed as a means for mounting orifice plates in a pipe line. The split coupling also affords ready access for purposes of assembly, inspection or replacement of the orifice plate 105.

The pipe section 1ᵇ has an orifice 125 drilled therein on the upstream side of the orifice plate 105, and an internally threaded boss 126 is welded as indicated at 127 to said pipe section in alignment with the orifice 125. One end of a conduit 128 is connected by a pipe fitting 129 to the boss 126, and the opposite end of said conduit is connected to a pipe fitting 129ᵃ mounted in a threaded opening 130 (see Fig. 4) in the intermediate member 68 communicating with the chamber 84, whereby to establish communication between the chamber in the pipe section 1ᵇ on the upstream side of the orifice 107 and the chamber 84 above the diaphragm 67 of the automatic pilot control 4. An orifice 131 (Fig. 3), similar to the orifice 125, is drilled in the pipe section 1ᵃ on the downstream side of the orifice plate 105, and a threaded boss 132 is welded, as indicated at 133, to the pipe section 1ᵃ in alignment with the orifice 131. A second conduit 134 has one end thereof connected with a pipe fitting 135 mounted in the boss 132 and its opposite end is connected to a pipe fitting 136 (Fig. 4) mounted in a threaded opening 137 formed in the valve cover 61 and communicating with the chamber 83, so that the pressure in the chamber of the pipe section 1ᵃ on the downstream side of the orifice 107 is communicated through the conduit 134 to the chamber 83 at the lower side of the diaphragm 67. Thus, it is apparent that the diaphragm 67 is directly subjected to the differential pressure in the pipe line 1 on the opposite sides of the orifice plate 105.

An orifice 138, similar to the orifices 125 and 131, is drilled in the pipe line 1 and a boss 139, similar to the bosses 126 and 132, is welded to said pipe line at a selected pressure-sensing point 140, which may be near or remote from the main valve 2 (depending upon the particular installation) and to which the automatic pilot 4 is to be further responsive. The pipe line 1 itself will offer frictional resistance to flow in accordance with its length and when valves, elbows or other fittings or flow-impeding elements are connected in the pipe line, the resistance to flow is increased. It is possible to accurately ascertain the unit pressure drop which occurs in the pipe line between any two points at any given rate of flow, for example, between the pressure sensing point 140 and the discharge point 5 of the pipe line; and the control device 4, in cooperation with the orifice plate 105 is so designed and/or adjusted and correlated as to compensate for this pressure loss, and to maintain a predetermined constant unit pressure at the discharge point 5. To this end, a pipe fitting 141 is threaded into the boss 139 and one end of a conduit 142 is connected to said fitting. The opposite end of the conduit 142 is connected to a pipe fitting 143 (Fig. 4) mounted in a threaded opening 144 formed in the intermediate section 68 of the control device 4 communicating with the chamber 88. Thus, the conduit 142 will communicate the pressure at the sensing point 140 in the pipe line 1, to the chamber 88 below the diaphragm 69. It will be observed that this pressure augments the pressure communicated to the chamber 83 from the upstream side of the orifice plate 105 and tends to raise the valve stem 76 to effect closing of the valve 57. On the other hand, the force of the spring 101 acting upon the diaphragm supporting plate 90, supplements the pressure in the chamber 84, communicated from the downstream side of the orifice plate 105 and acting on the diaphragm 67, to urge the stem 76 downwardly, and consequently both tend to open the valve 57. Therefore, in order for the valve 57 to close, the sum of the pressures in the chambers 83 and 88 must exceed the sum of the pressure in the chamber 84 and the force of the spring 101. The opening of the valve 57, of course, permits operating fluid from the diaphragm chamber 33 of the main valve 2 to escape from said chamber through the conduit 32, valve 57, and fittings 58 to the outlet chamber 8 of said main valve to relieve the pressure in the chamber 33 and thereby permit line pressure in the inlet chamber 7 to flex the diaphragm 14 upwardly to open, or increase flow through the main valve 2. The valve 57 has a much greater flow capacity than is permitted by the restrictive orifice 50 in the strainer 34, so that it is possible for the main valve 2 to open, notwithstanding the fact that flow continues through the orifice 50, but at a rate ineffective to build up any pressure in the chamber 33 to close the main valve 2, so that the valve 2 will remain at least partially open so long as the flow rate through the valve 57 is greater than that through the orifice 50. Of course, if the flow rate through the valve 57 is reduced under the influence of the pressure differential control means associated therewith, to less than that through the orifice 50, then pressure will begin to build up on the inlet side of the valve 57 and be communicated through the conduit 32 to the diaphragm chamber 33 to move the disc 15 and sealing member 23 of the main valve 2 toward closed position.

Assuming that a given constant unit pressure, for example, a pressure of 40 #/sq. in. is desired at the discharge point 5 of the pipe line 1, and the unit pressure drop in the pipe line 1 between the sensing point 140 and the discharge 5 is ascertained to be 10 #/sq. in. at a flow rate of 50 G. P. M., it is apparent that the pressure at the sensing point 140 must be maintained at 50 #/sq. in. The screw 96 of the control device 4 would then be adjusted to impose the necessary spring load on the diaphragm 67 to match the constant unit pressure desired at the discharge 5 of 40 #/sq. in. This set spring load would be maintained constant by locking the adjusting screw 96 in place by the jam nut 97. The pressure drop from the sensing point 140 to the discharge point having been ascertained to be 10 #/sq. in., a corresponding pressure differential is produced in the pipe line 1 through the use of the orifice plate 105 to create a pressure differential equal to 10 #/sq. in at a flow rate of 50 G. P. M. This orifice differential thus matches the resistance in the pipe 1 between the pressure sensing point 140 and the discharge point 5.

The pressure differential across the orifice plate 105 will vary more or less from 10 #/sq. in. depending upon changes in the rate of flow through the pipe line 1, but in any event, will correspond to and always substantially match the pressure differential between the pressure sensing point 140 and the discharge point 5 as the flow rate varies.

Under no flow or static conditions, there would be no pressure loss through the orifice plate 105 and the unit pressure in the pipe sections 1ᵃ and 1ᵇ would be equal. Likewise, under no flow or static conditions there would be no pressure loss between the sensing point 140 and the discharge point 5. Also under static conditions, with equal pressures in the chambers 83 and 84 on opposite sides of the diaphragm 67, there would be no pressure differential available to affect the action of the valve 57. However, under flow conditions, for example, a flow rate of 50 G. P. M., the unit pressure on the upstream side of the orifice plate 105 would be 10 #/sq. in. greater than the pressure on the downstream side of said orifice plate. With these pressures respectively applied to the chambers 84 and 83, there would be a resultant differential pressure of 10 #/sq. in. acting in the same direction as the force of the spring 101. So long as the pressure at the sensing point 140 is substantially 50 #/sq. in., the valve 57 will be open, but with a pressure greater than 50 #/sq. in. at the sensing point 140, this pressure would be communicated to the chamber 88 to act upwardly on the diaphragm 69, and would be sufficient to overcome the downward force of the spring 101 (equivalent to 40 #/sq. in. pressure) plus the 10 #/sq. in. differential pressure acting downwardly in the chamber 84, to effect closing of the valve 57.

In the normal operation of the main valve 2 and its automatic control means 4, line pressure on the upstream side of the main valve 2 may be as high as 125 #/sq. in. so that it will readily overcome the weight of the valve stem 17, etc., and flex the diaphragm 14 upwardly so that fluid can flow through said main valve toward the discharge 5. The main valve 2 really functions as a pressure regulating valve closely controlled by the automatic pilot 4 so as to maintain a substantially constant pressure of 40 #/sq. in. at the discharge point 5 while compensating for the pressure loss due to the flow resistance in the line 1 beyond the pressure sensing point 140. Should the pressure at the sensing point 140 tend to drop below 40 #/sq. in., plus the pressure differential across the orifice plate 105, as when a sudden substantial increase in demand is made, this will be reflected to the control device 4 and open valve 57, which, in turn, will cause the main valve 2 to open further and increase the pressure on the downstream side. Similarly, should the pressure at the sensing point 140 seek to rise above 40 #/sq. in. plus the pressure differential across the orifice plate 105, the control 4 will cause the valve 57 to close, thereby preventing by-passing of operating fluid around the valve 2 with the result that flow will be diverted to diaphragm chamber 33 through conduit 32 and cause the main valve 2 to partially or completely close, or to correspondingly modulate the flow to maintain a substantially constant unit discharge pressure at the point 5, irrespective of fluctuations in the rate of demand from the pipe line. With a reduced demand, obviously, the flow through the main valve 2 must be correspondingly reduced in order to prevent a pressure substantially in excess of 40 #/sq. in. being built up at the discharge point 5. The necessary action on the part of the main valve 2 to effect the functions stated is obtained through the sensitive automatic pressure differential operated control means 4 by controlling the admission and exhaust of operating fluid to the diaphragm chamber 33, in the manner explained hereinbefore. The rate at which the main valve 2 closes is controlled by the size of the orifice 50 in the strainer 35. The orifice 50 restricts flow to the diaphragm chamber 33 to a rate such that the valve action will be smooth and quiet, and will close completely, if necessary, without producing shock in the pipe line 1.

Figure 7:
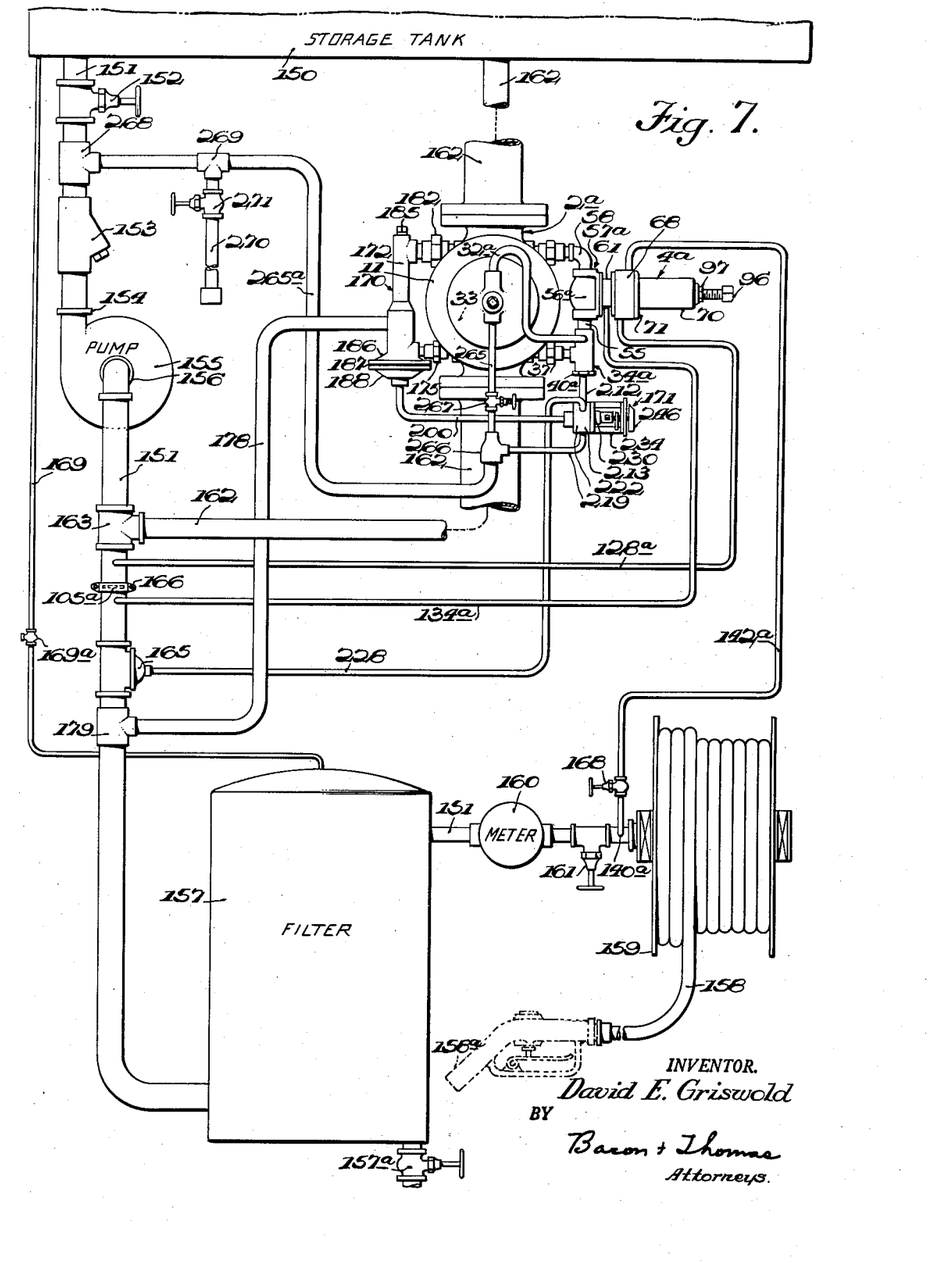
Fig. 7 is a diagrammatic view illustrating the use of a main valve and modified automatic pressure differential operated pilot valve as a by-pass around a pump in a liquid or gasoline dispensing system.
Figure 8:
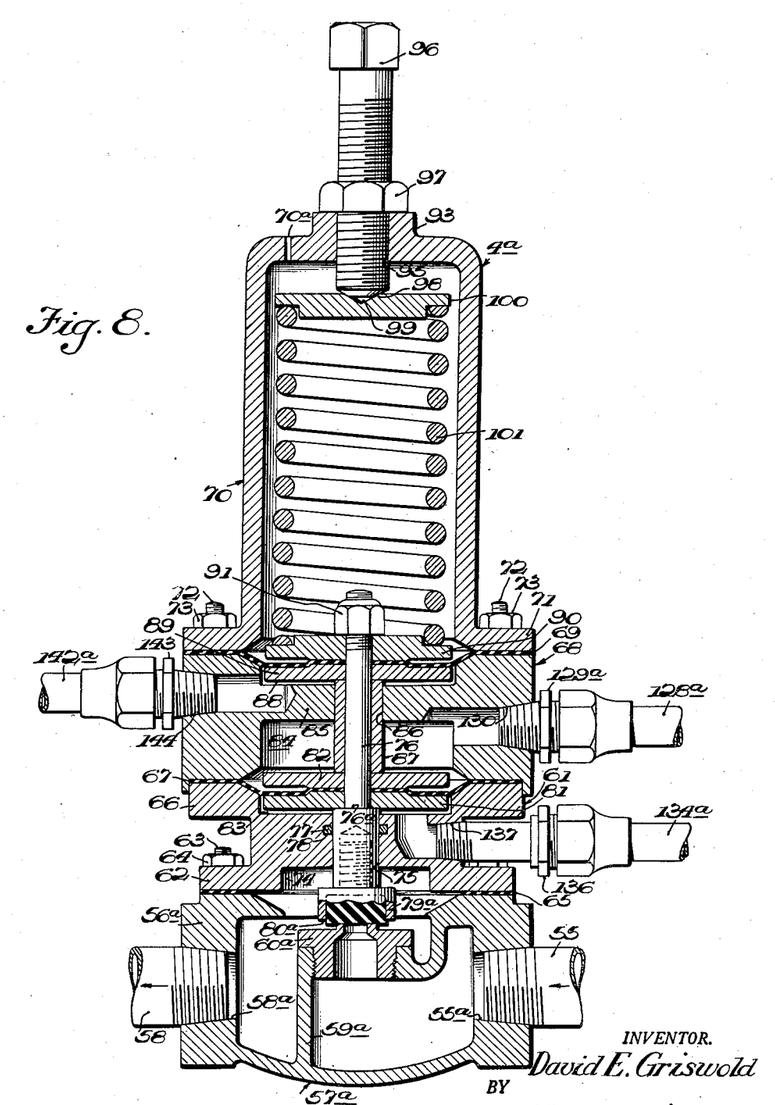
Fig. 8 is a vertical sectional view through the automatic pilot valve shown in Fig. 7.

While the conduits 128 and 134 have been shown connected with the left-hand side of the control device 4 and the conduit 142 connected with the right-hand side of said device, it will be apparent that the cover 61 and/or the intermediate section can be mounted in any desired angular relation to the valve body 56, and in fact, these elements are shown in the diametrically opposite relation in Figs. 7 and 8. It will also be apparent that a body different from the body 56 may be substituted therefor, and a modified body is also shown in these figures. In other words, the several parts and connections can be constructed and arranged in the manner best suited for any given installation.

Fig. 7 diagrammatically illustrates a main valve, identical to that shown in Figs. 1 and 2, and automatic control means therefor, slightly different from that shown in Fig. 1, associated with other elements in a liquid flow control system. By way of disclosing an operative example, and not limitation, a gasoline dispensing system has been illustrated and described herein in which it is desired to maintain a substantially constant unit pressure at the discharge end of a gasoline delivery hose, regardless of variations in flow rate occasioned by changes in demand.

In Fig. 7, the illustrated apparatus is shown very schematically, without any attempt having been made to illustrate all of the parts in their correct relative sizes. However, the manner in which the various parts are interconnected to accomplish the desired results has been clearly shown. Thus, a storage tank 150 adapted to contain gasoline (or any other liquid) has one end of a pipe line 151 connected thereto which includes a manually operable shut-off valve 152 located adjacent said tank. A conventional strainer 153 is connected in the pipe line 151 just ahead of the inlet 154 of a conventional pump 155. The pipe line 51 continues from the outlet 156 of the pump 155 to the lower end of a conventional gasoline filter 157. A valve 157$^a$ is connected with the lower end of the filter 157 for cleanout purposes. The pipe line 151 further extends from the outlet of the filter 157 and is connected with one end of a delivery hose 158 mounted upon a conventional hose reel 159. A meter 160 is connected in the pipe line 151 adjacent the filter 157 and a manually operable shut-off valve 161 is connected in said pipe line between the meter and the hose reel 159. A main valve 2$^a$, similar to the valve 2 previously described, is connected in a pipe line 162 in by-passing relation to the pump 155. It is to be understood that the pipe line 162 is of the same diameter throughout its length, although it has not been so shown in Fig. 7, solely in the interest of facilitating illustration. One end of the pipe line 162 is connected to the stem of a pipe-T 163 forming a part of the pipe line 151 and the opposite end of the pipe line 162 is connected to the storage tank 150. It will be apparent, therefore, that when the valve 2$^a$ is open, gasoline discharged from the pump 155 in excess of the demand can return to the tank 150 through the pipe line 162.

A strainer 34$^a$ and an automatic pilot control device 4$^a$, somewhat similar to the strainer 34 and control 4, respectively, previously described, are connected by pipe fittings with the main valve 2$^a$ in the same manner as shown in Fig. 1, and in the interest of brevity, the corresponding parts have been identified by the same numerals and will not be redescribed hereinafter, except to point out the differences.

The control device 4$^a$ is best shown in Fig. 8 and embodies a modified form of valve 57$^a$ comprising a body 56$^a$ having a partition 59$^a$ separating the inlet and outlet openings 55$^a$ and 58$^a$. A valve seat 60$^a$ is mounted upon the partition 59$^a$. A holder 79$^a$ for a resilient valve disc 80$^a$ is secured to the lower end of the valve stem 76 and is engageable with the seat 60$^a$ to form a seal therewith to prevent flow through the valve. However, it will be noted that with the valve stem arrangement shown in Fig. 8, the spring 101 tends to urge the stem 76 toward valve closing position, instead of toward valve opening position, as in Fig. 4. Hence, the valve 57$^a$ will remain closed until a pressure in excess of, for example, 40 #/sq. in. plus the pressure differential across the orifice plate 105$^a$ at the sensing point 140$^a$ (Fig. 7) is communicated to the pressure chamber 88.

An orifice plate 105$^a$, Fig. 7, similar to the orifice plate 105, is disposed in the pipe line 151 between the pipe-T 163 and a shut-off valve 165. The valve 165 may be a manually operated valve, but is preferably like valve 2 and hydraulically operated, for reasons which will appear later. The plate 105$^a$ is connected in the pipe line 151 by a split coupling 166 similar to the coupling comprising the sections 110—111 shown in Figs. 1 and 3. A conduit 128$^a$ is connected to the pipe line 151 on the upstream side of the orifice plate 105$^a$ and a conduit 134$^a$ is connected to the pipe line 151 on the downstream side of said plate. These conduits communicate with the chambers 84 and 83, respectively, of the control device 4$^a$. A conduit 142$^a$ is connected at one end with the pipe line 151 at a point between the valve 161 and the inlet connection to the hose reel 159 and its opposite end is connected with the chamber 88, so that a pressure sensing point is established at 140$^a$. A manually operable shut-off valve 168 is connected in the conduit 142$^a$ adjacent the hose reel 159.

In the normal operation of the system thus far described, the pump 155 will withdraw gasoline from the storage tank 150, pump it through the filter 157 and meter 160 and through the hose 158 to the point of delivery, such as a tank (not shown), or a nozzle 158$^a$ shown in dot-and-dash lines. The pressure responsive control 4$^a$ functions to control the supply and exhaust of operating fluid to the valve 2$^a$, in the same manner previously described, to control the by-pass valve 2$^a$ to maintain a predetermined constant unit pressure at the discharge end of the hose 158. The orifice plate 105$^a$ is calibrated in the present instance to creat a pressure differential in the pipe line 151 equal to the pressure loss existing in the system between the pressure sensing point 140$^a$ and the discharge end of the hose 158 under any given flow rate. The pressure differential is reflected to the control 4$^a$ and is utilized to compensate for the pressure loss beyond the sensing point 140$^a$ in maintaining the constant delivery pressure of 40 #/sq. in. The valve 2$^a$ functions to maintain the desired unit discharge pressure by automatically opening or closing to by-pass more or less of the pumped gasoline in accordance with the fluctuations in demand at the discharge end of the hose 158. The control 4$^a$ is very sensitive to changes in pressure and exerts a corresponding close control over the operation of the valve 2$^a$.

Any vapor or air separated from the gasoline as it passes through the filter 157 is returned to the storage tank 150 through a conduit 169. A conventional check valve 169$^a$ is connected in the conduit 169 to permit the flow of vapor or air to the storage tank 150 while preventing any possible flow of air or gasoline in the opposite direction. A conventional float operated air release valve (not shown) is also connected in series with the check valve 169$^a$, between said check valve and filter 157, to release air from the filter.

It is highly desirable in apparatus for dispensing inflammable liquids, such as gasoline, fuel oil, etc., to provide means for evacuating or withdrawing the liquid in the system between the pump and the discharge end of the delivery hose in order to avoid creating a fire hazard. To this end, an ejector or evacuator 170 is conveniently connected across the valve 2$^a$ and arranged in the system in such manner that it will function to withdraw gasoline from the system at all points beyond the shut-off valve 165, which is connected in the pipe line 151 between the pump 155 and the inlet of the filter 157. A manually operable pilot valve 171 for controlling the operation of the evacuator 170 is also provided, and the construction and operation of these devices and the manner in which they are connected in the system will now be described.

Figures 9, 10, 11, 12:
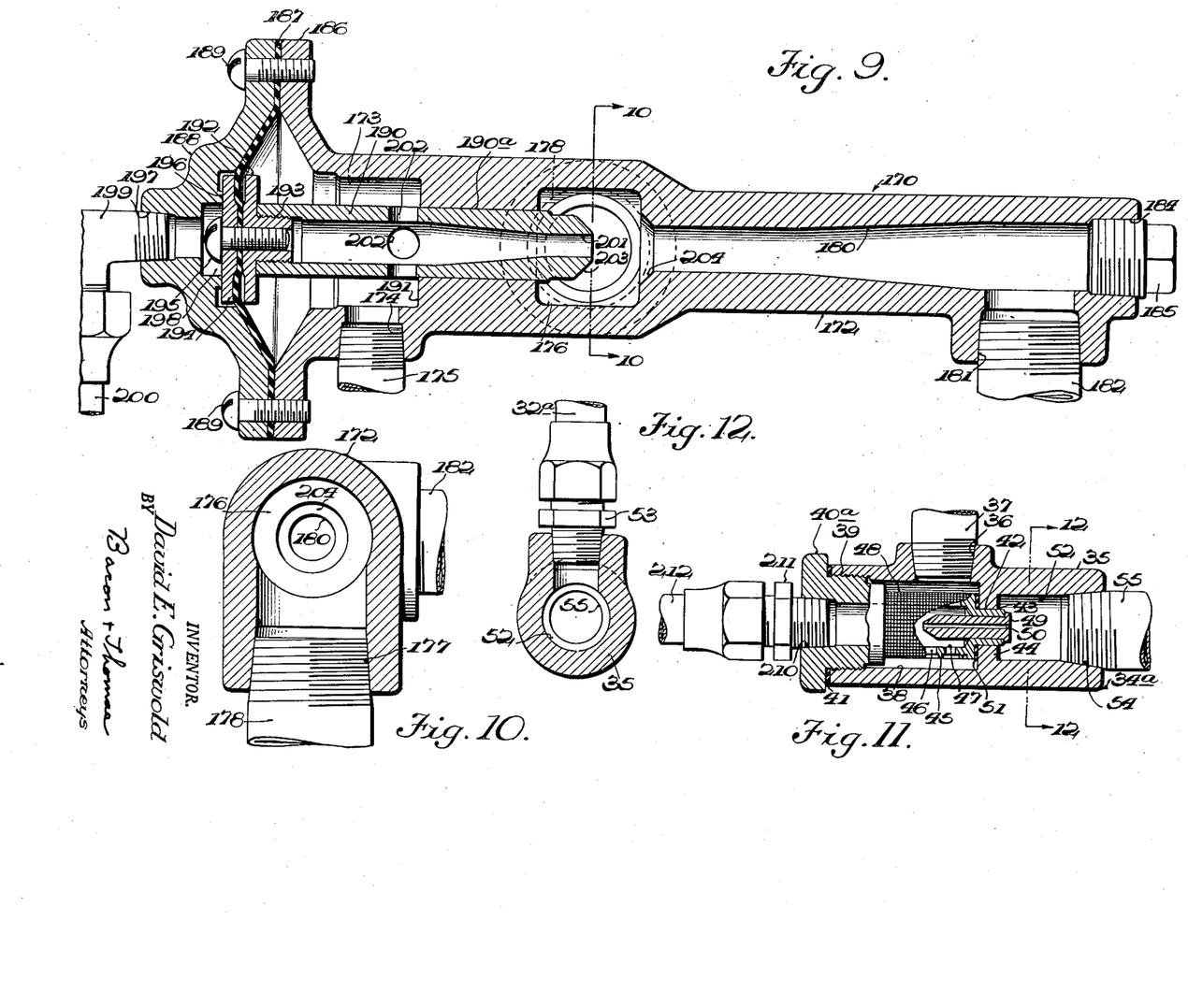
Fig. 9 is a horizontal sectional view through an evacuator or ejector connected with the main valve and employed in the system for withdrawing liquid or gasoline from the discharge hose.
Fig. 10 is a vertical sectional view taken on the line 10—10 of Fig. 9.
Fig. 11 is a horizontal sectional view through a modified orifice-equipped strainer associated with the main valve shown in Fig. 7.
Fig. 12 is a vertical sectional view taken on the line 12—12 of Fig. 11.

Referring now to Figs. 9 and 10, the evacuator 170 comprises an elongated, hollow housing 172 provided with a chamber 173 having a threaded pressure-fluid inlet opening 174 communicating therewith. The inlet opening 174 is connected by pipe fittings 175 with the inlet side of the main valve 2$^a$. The housing 172 is also provided with a chamber 176 having a threaded opening 177 connected to one end of an evacuating pipe line 178, the opposite end of which is connected to the stem of a pipe-T 179 comprising part of the pipe line 151. The housing 172 is further provided with a Venturi passageway 180, one end of which communicates with the chamber 176 and the opposite end with a threaded opening 181 connected by pipe fittings 182 with the outlet side of the valve 2$^a$. The end of the passage 180 remote from the chamber 176 is threaded as indicated at 184 for the reception of a pipe plug 185. The housing 172 is still further provided with a flange 186 adjacent the chamber 173 and a flexible diaphragm 187 is interposed between the flange 186 and a cover 188, said cover and diaphragm being secured to the flange 186 by a plurality of screws 189.

A nozzle 190 is slidably mounted in an opening 190$^a$ formed in a wall 191 disposed between the chambers 173 and 176. A diaphragm supporting plate 192 has a shank portion 193 threaded into one end of the nozzle 190. Another diaphragm supporting plate 194 is secured to the plate 192 by a screw 195. The plate 194 is adapted to engage an annular abutment 196 on the cover 188 to limit movement of the nozzle 190 toward the left, as viewed in Fig. 9. The cover 188 is further provided with a threaded opening 197 which communicates with a pressure chamber 198 formed jointly by the cover 188 and the diaphragm 187. A pipe fitting 199 is mounted in the opening 197 and one end of a conduit 200 is connected to said pipe fitting. The opposite end of the conduit 200 is connected with the manually operable pilot valve 171 as and for a purpose which will be described later.

The nozzle 190 has a Venturi passage 201 in axial alignment with the Venturi passageway 180 in the housing 172. The nozzle 190 is further provided with a plurality of ports 202 which establish communication between the chamber 173 and the Venturi passage 201. The end of the nozzle 190 remote from the diaphragm 187 is chamfered on an angle of about 45°, as indicated at 203 and is adapted to engage with a complementary conical seat 204 formed at the entrance to the Venturi passage 180. The passages 202 are so located in the nozzle 190 that when the nozzle end 203 is engaged with the seat 204, said passages are disposed within the opening 190ᵃ in the wall 191 and communication between the chambers 173 and 176 is thus blocked to render the evacuator inactive.

The strainer 34ᵃ is best shown in Figs. 11 and 12, and is generally similar to the strainer 34 shown in Fig. 3, described hereinbefore, and the corresponding parts have been identified by the same reference numerals. The principal difference between the two strainers resides in the fact that in the strainer 34ᵃ, a plug 40ᵃ replaces the plug 40 and is provided with a threaded opening 210 which communicates with the chamber 47 within said plug. A conduit 32ᵃ connects the strainer 34ᵃ with the diaphragm chamber of the valve 2ᵃ. A pipe fitting 211 is mounted in the opening 210 and one end of a conduit 212 is connected to said fitting. The opposite end of said conduit 212 is connected to the pilot valve 171, as will presently be described.

The manually operable pilot valve 171 is illustrated in detail in Figs. 13 to 16 inclusive, and comprises a base 213 having a passageway 214 threaded at its outer end in which a fitting 215 is mounted, and to which the opposite end of the conduit 212 is connected. A supply port 216 extends from the passageway 214 to the inner face of the base 213. Another passageway 217 is threaded at its outer end and has a pipe fitting 218 mounted therein to which one end of a conduit 219 is connected. The passage 217 communicates with an axial exhaust port 220 which opens to a seat 221 on the inner face of the base member 213. The base 213 has a projecting boss 222 provided with an axial passageway 223 threaded at its outer end for the reception of a pipe fitting 224, and to which one end of the conduit 220, previously referred to, is connected. Three ports 225, Fig. 15, extend from the passage 223 to the seat 220. These ports are smaller in diameter than the axial port 220; are all located the same radial distance from the axial port 220; and are spaced 120° apart. The port 220 preferably has a flow capacity equal to the combined capacity of the three ports 225. It will be noted that one of the ports 225 lies on a radius common to the supply port 216.

Figure 15:
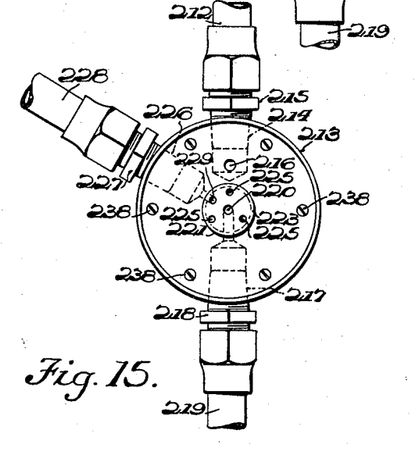
Fig. 15 is an elevational view of the base of the pilot valve shown in Fig. 13 and particularly illustrating the parts formed therein.

The base 213 has another passageway 226 threaded at its outer end in which a fitting 227 is mounted and to which one end of a conduit 228 is secured. The opposite end of the conduit 228 is connected with the diaphragm pressure chamber of the shut-off valve 165. A port 229, located midway between two of the ports 225 is formed in the seat 221 and communicates at all times with the passageway 226.

A hollow housing 230 (Fig. 13) has an outwardly extending rimmed flange 231 which receives the inner end of the base 213 therein and positions the parts in registration. The housing 230 provides a pressure chamber 232 for operating fluid under pressure for controlling the operation of the evacuator 170 and the valve 165, as will be explained hereinafter. An annular gasket 233 is disposed between the flange 231 and the base 214 to form a fluid-tight seal. A bracket 234 includes annular end portions 235 and 236 interconnected by struts 237. The annular portion 235 is engaged with the flange 231 and a plurality of screws 238 extend through the base 213 into suitable threaded openings in the annular portion 235 and secure the base 213, gasket 233, housing 230, and bracket 234 in assembled relation. The port 216 in the base 213 establishes communication between the conduit 212 and the pressure chamber 232, whereby the pressure in the inlet chamber of the valve 2ᵃ is always communicated to the pressure chamber 232 through the strainer 34ᵃ and conduit 212.

A pilot shaft 241 is suitably mounted in the housing 230 and one end thereof projects into the pressure chamber 232. An indicia bearing plate 242 is secured to the annular portion 236 of the bracket 234 by a plurality of machine screws 243 which are long enough to serve as bolts for mounting the pilot valve 171 upon a panel or other support 244, shown in dot-and-dash lines in Fig. 13. The annular bracket portion 236 and the plate 242 have aligned openings in which a bushing 245 for the pilot shaft 241 is mounted. The shaft 241 projects beyond the plate 242 and has an operating knob 246 secured thereto by a screw 247.

Figure 13:
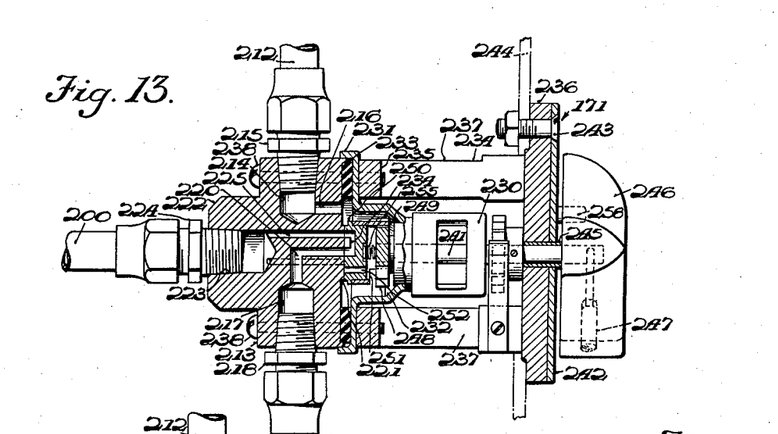
Fig. 13 is a longitudinal sectional view through a manually operated pilot valve for controlling the evacuator.

The inner end of the shaft 241 carries a three-pronged drive member 248 operatively engaged with a cooperating cylindrical extension 249 forming part of a pilot disc 250. The extension 249 has three notches 251 (Fig. 16) adapted to be engaged by the prongs of the drive member 248 for effecting rotation of the pilot disc 250 in accordance with the actuation of the knob 246. The pilot disc 250 engages the seat 221 formed on the base 213 and is provided with three pressure ports 252, which extend completely therethrough and are spaced 120° apart. The pilot disc 250 is also provided with three U-shaped exhaust ports 254, all having a common, relatively large, inner leg 253 axially aligned with the exhaust port 220 in the base member 213. The pressure ports 252 and the exhaust ports 254 of the pilot disc 250 are adapted to alternately register with the ports 225 and the port 229 formed in the base 213. A compression spring 255 is axially disposed between the drive member 248 and the pilot disc 250 to maintain the latter engaged with the seat 221 in the absence of fluid under pressure in the chamber 232.

Figure 14:
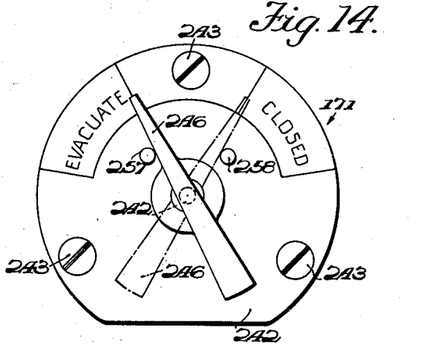
Fig. 14 is a right end elevator view of the manual pilot valve shown in Fig. 13.
Figure 16:
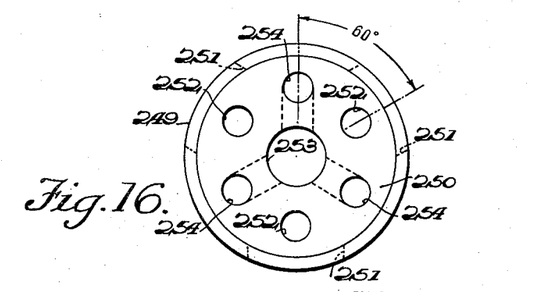
Fig. 16 is a view of the base of the pilot disc shown in Fig. 13.

As will be apparent from Fig. 16, the pressure ports 252 and the exhaust ports 254 are spaced 60° apart. Hence, it is only necessary to turn the knob 246 and shaft 241 through an angle of 60° in order to move the pilot disc 250 from one of its operative positions to the other. As is best shown in Fig. 14, the indicia plate 242 bears the legends "Closed" and "Evacuate." The knob 246 is illustrated in full lines in the position it assumes when it is desired to place the evacuator 170 in operation, or in its "Evacuate" position to withdraw the gasoline from the hose 158 and filter 157, as will be described in further detail later. A stop pin 257 is then engaged by the knob 246 to limit its movement in a counter-clockwise direction. Another stop pin 258 is adapted to be engaged by the knob 246 when said knob is turned clockwise to a position to discontinue operation of the evacuator 170, and wherein the evacuator is "Closed."

Referring now to Fig. 7, a conduit 265 is connected to cover 11 of the main valve 2ᵃ and communicates with the diaphragm pressure chamber 33 therein. A three-way fitting 266 is connected to the conduit 265 and one end of the conduit 219 is connected with the stem of said fitting. A manually operable shut-off valve 267 is connected in the conduit 265 between the valve cover 11 and the fitting 266. A conduit 265ᵃ is connected with the fitting 266 and forms a continuation of the conduit 265. The opposite end of the conduit 265ᵃ is connected to a pipe-T 268 comprising part of the pipe line 151. The conduit 265ᵃ has a pipe-T 269 connected therein, with the stem of the T connected to a branch pipe 270, which is adapted to serve as a suction connection for effecting refilling of the storage tank 150, as will be explained later. A shut-off valve 271 is connected in the branch pipe 270 and is adapted to be opened to establish communication between the pipe 270 and the inlet 154 of the pump 155.

Under static conditions with no flow through the orifice plate 105ᵃ and the hose line 158, the unit pressure in the line 151 and in the conduits 128ᵃ and 134ᵃ will be equal. Therefore, the pressure on both sides of the diaphragm 67, Fig. 8, will be equal and will not resist movement of the valve stem in either direction. However, under flow conditions, the pressure in the conduit 128ᵃ will be greater than the pressure in the conduit 134ᵃ, due to the pressure drop across the orifice plate 105ᵃ, and this pressure differential acting on the diaphragm 67 will produce a force effective in the same direction as the force of the spring 101 and will be added to the spring force. Therefore, a higher pressure at the pressure sensing point 140ᵃ than the spring force will be required in order to overcome the spring force and said differential pressure. As a result, the pressure delivered to the sensing point 140ᵃ will be equal to a set pressure (as set by adjusting the force of the spring 101 under static conditions) plus a pressure equal to the pressure drop across the orifice plate 105ᵃ. The pressure differential across the orifice plate 105ᵃ added to the set pressure is equal to the necessary operating pressure at the pressure sensing point 140ᵃ. The pressure differential created by orifice plate 105ᵃ, reflected to the control 4ᵃ, to control the operation of the valve 57ᵃ to allow exhaust or cause admission of operating fluid through conduit 32ᵃ to the diaphragm chamber of the main valve 2ᵃ, functions to offset the pressure loss beyond the sensing point 140ᵃ, as before explained.

The main valve 2ᵃ, as previously pointed out, is installed in a by-pass line 162 around the pump 155. This valve is of the modulating type and operates to open and close to by-pass excess pressure back to the storage tank 150, to thereby maintain a constant pressure at the end of the hose line 158.

The automatic differential pressure operated pilot valve 4ᵃ operates in accordance with the pressure differential communicated thereto through the conduits 128ᵃ and 134ᵃ connected to the pipe line 151 on the upstream and downstream sides, respectively, of the orifice plate 105ᵃ. The line pressure from these points actuates the pilot control 4ᵃ, which, in turn, controls the main valve 2ᵃ, as previously explained. The valve 2ᵃ, will open to permit flow at full capacity, if necessary, or will throttle and modulate to compensate for the change in flow rate through the fueling nozzle 158ᵃ. The pressure sensing point 140ᵃ is preferably taken beyond the filter 157 and meter 160 so that the pressure loss induced by these elements is compensated for and does not effect the ultimate delivered pressure, even though this pressure loss is variable and can be created by any other resistance or pressure changing elements. In certain installations, the filter 157 and/or the meter 160 may be omitted entirely, if desired. In addition to the pressure control from the sensing point 140ᵃ, the differential pilot valve 4ᵃ is controlled by pressure conditions on the opposite sides of the orifice plate 105ᵃ to cause the pilot valve to compensate for the pressure loss between the pressure sensing point 140ᵃ, and the discharge end of the hose 158.

The control device 4ᵃ functions, in principle, exactly like the control device 4, in response to the differential pressure across the orifice plate 105ᵃ, the pressure at the sensing point 140ᵃ, and the predetermined force, or set pressure applied by the spring 101. However, it will be apparent that the valve stem 76 of the control device 4ᵃ will move upwardly in response to pressure in excess of 40 #/sq. in. plus the pressure differential across the orifice plate 105ᵃ at the pressure sensing point 140ᵃ, and that as a result thereof the closure member 80ᵃ of the valve 57ᵃ will be moved out of contact with the seat 60ᵃ to permit the main valve 2ᵃ to open, or to open wider if it is already partially open, and thereby allow the main valve 2ᵃ to by-pass excess liquid from the pipe line 151 back to the storage tank 150 to maintain the desired predetermined unit pressure of 40 #/sq. in. at the dispensing end of the hose 158.

During a normal fuel dispensing operation, the control knob 246 of the pilot valve 171 is in its "Closed" position shown in dot-and-dash lines in Fig. 14, so that the evacuator 170 is maintained out of operation, and the fluid pressure operable valve 165 is open. The pressure ports 252 of the pilot disc 250 then register with the seat ports 225 and operating fluid under pressure can flow from the pilot pressure chamber 232 through the pilot disc 250, base 213 and conduit 200 to the diaphragm chamber 198 of the evacuator 170 with the result that the diaphragm 187 is quickly flexed toward the right and the nozzle 190 is thus correspondingly shifted until its end 203 engages with the seat 204, so that communication between the chamber 176 and the secondary Venturi passage 180 is interrupted by movement of the nozzle 190 itself, the entrance of fluid from the chamber 173 into ports 202 communicating with the primary Venturi passage 201 being blocked by the wall 191. At the same time, one of the exhaust ports 254 of the pilot disc 250 will register with the seat port 229 to exhaust operating fluid from the pressure chamber of the diaphragm valve 165 to allow the same to open under line pressure.

The manual actuation of the pilot valve 171, as aforedescribed, has no effect on the fluid pressure in the diaphragm chamber 33 of the main valve 2ᵃ. Consequently, the operation of the main valve 2ᵃ is independent of the pilot valve 171, and normally functions in accordance with the control exerted by the automatic pressure responsive device 4ᵃ. Thus, the pilot valve 171, when in its "Closed" position, will maintain the evacuator 170 idle.

After completion of current refueling operations, and in order to evacuate the hoseline 158, the knob 246 of the manual pilot control 171 is moved 60° counter-clockwise to its "Evacuate" position. The exhaust ports 254 of the pilot disc 250 then register with the seat ports 225 and permit the flow of operating fluid from the diaphragm chamber 198 of the evacuator 170 through conduit 200 and into the conduit 219, fitting 266, the conduit 265ᵃ and pipe 151 for exhaust to the inlet side of the pump 155. The pressure in the inlet chamber of the main valve 2ᵃ is communicated through the pipe fittings 175 to the chamber 173 and acts upon the diaphragm 187 to flex said diaphragm toward the left to quickly force the fluid from the diaphragm chamber 198 for exhaust through the pilot valve 171. The flexing of the diaphragm 187 toward the left moves the nozzle 190 into its active position illustrated in Fig. 9. Simultaneously, with the conditioning of the evacuator 170 for operation, one of the pressure ports 252 registers with the port seat 229 and operating fluid under pressure flows through the conduit 228 to the pressure chamber of the valve 165 to effect automatic closing thereof. The closing of valve 165 relieves the pressure from the filter 157 and the hose 158 as well as from conduit 142ᵃ and pressure chamber 88. This causes the spring force to move the stem 76 downwardly, closing valve 4ᵃ and thereby closing the main valve 2ª. With the main valve 2ª closed, the fuel pump delivery pressure is available as a differential across the evacuator.

It will be apparent from Fig. 9 that operating fluid under pressure from the chamber 173 can now flow through the ports 202 into the primary Venturi passage 201 of the nozzle 190, and then across the throat between the nozzle end 203 and the secondary Venturi passage 180 in the housing 172 to create a suction or vacuum condition in the chamber 176 and in the evacuating conduit 178. This operating fluid and entrained fluid from the conduit 178 discharge through the pipe fittings 182 into the outlet chamber of the main valve 2ª for return through the pipe 162 to the storage tank 150.

While the hoseline 158 is being evacuated, the pump 155 is maintained in operation and, the valve 165 being closed as noted above, the main by-pass valve 2ª is closed during the evacuating operation as a result of the aforementioned pressure conditions in order to provide the maximum possible pressure differential to operate the evacuator 170.

With the valves 165 and 2ª closed, full pump pressure is available to operate the evacuator 170. Thus, fluid in the inlet chamber of the main valve 2ª is then available to operate the evacuator 170 and the suction created thereby in the conduit 178 will withdraw all liquid in the system beyond the shut-off valve 165 for return to the storage tank 150 through the conduit 178, the evacuator 170, the outlet chamber of said main valve, and pipe 162. The meter 160 is preferably of the conventional double-acting type, that is to say, it will subtract from its reading that volume of gasoline which is returned from the hoseline 158 to the system through the operation of the evacuator. Obviously, evacuation of the hose 158 can be facilitated, if desired, by opening the discharge end of said hose to the atmosphere. However, it is preferable to only partially open the hose 158 to the atmosphere in order to facilitate evacuation while at the same time taking advantage of the resulting vacuum condition created therein to cause the flexible hose to collapse, thereby facilitating the winding of the hose on its reel 159. After the hose 158 and/or the filter 157 has been evacuated, the valve 161 is closed and the pump 155 is stopped. If desired, the valve 161 may be closed as soon as the meter 160 stops indicating a reverse flow inasmuch as the hoseline 158 will then be empty.

Rapid opening of the valve 2ª to wide open position can be effected, if desired for any reason, independently of the control 4ª by manual opening of the valve 267 to thus place the diaphragm chamber 33 of the main valve 2ª in direct communication with the inlet of the pump 155. The pressure in the inlet chamber will also act on the diaphragm 14 to facilitate quick opening of the main valve 2ª.

In addition to the foregoing functions, the present system is such that the pump 155 can be utilized to refill the storage tank 150 by connecting the coupling at the end of the branch pipe 270 to a source of supply. The valve 161 is maintained closed, and the pilot valve knob 246 is moved to the "Evacuate" position to place the evacuator 170 in action and to simultaneously close the valve 165. The valve 267 is opened to allow the pressure fluid to be drained from the diaphragm chamber 33 of the main valve 2ª, thereby allowing the main valve to fully open independently of the control 4ª. With the valve 2ª open, gasoline can then be drawn through the branch pipe 270 and pipe line 151, to the intake of pump 155, thence into the by-pass pipe 162, through the by-pass valve 2ª, and into the tank 150 to refill the same. At the same time, the evacuator 170 is active so that gasoline also flows through the same and creates a reduced pressure condition in the conduit 178. On the other hand, if it is desired to pass the gasoline from the supply source to the hose 158, without first pumping it into the tank 150, then the knob 246 is placed in the "Closed" position, to thereby open the valve 165 and to render the evacuator 170 inactive. The gasoline will then be drawn into the inlet of the pump 155 through the pipe 270 and pumped to the filter 157 and hose 158, and the system will then function the same as when the pump is withdrawing gasoline from the tank 150, it being understood that the valve 152 is closed when the pipe 270 is used as a supply for ultimate discharge through the hose 158.

It will be understood that the principles of fluid flow control set forth herein are applicable to gases as well as liquids, and that the particular discharge pressures desired will vary according to the particular installation as will also the pressure drop from a selected pressure sensing point to the discharge point. The important consideration is that the control device be made responsive to the pressure differential at the sensing point and the differential pressure across a flow restriction which is matched to the pressure drop between the sensing point and the discharge point.

It will also be apparent that changes may be made in the details of construction of the main valve, the automatic pressure differential pilot controls, the pilot valve, the ejector, etc., and in the arrangement of these parts in a system, without departing from the principles of the invention or the scope of the annexed claims.

I claim:

1. Liquid handling apparatus, comprising: a liquid storage tank; a pump connected with said storage tank for pumping liquid therefrom; a delivery hose connected with said pump; means connected in by-passing relation to said pump for returning excess pumped liquid to said tank; and automatic means including pressure sensing means connected in advance of said delivery hose controlling the return of excess liquid through said by-passing means to thereby maintain a given substantially constant unit pressure at the discharge end of said delivery hose.

2. Liquid handling apparatus, comprising: a liquid storage tank; a pump connected with said storage tank for pumping liquid therefrom; a delivery hose connected with said pump; means connected in by-passing relation to said pump for returning excess pumped liquid to said tank; and means communicating with said delivery hose and operable by liquid by-passed around said pump for evacuating said delivery hose.

3. Fluid flow control means, comprising: conduit means for conducting fluid; a fluid pressure operable main valve connected with said conduit means; and automatic pressure differential operated control means connected with said valve including a fluid pressure operable element controlling the volume of operating fluid effective to actuate said main valve, and means for controlling said element in accordance with the pressure differential between (1) a pressure sensing point in said conduit means, located at a point spaced from the discharge end of said conduit means and beyond which point said conduit means offers a known resistance to flow at a given flow rate, and (2) the differential pressure across an orifice in said conduit means offering substantially the same resistance to flow at said given flow rate as said known resistance in said conduit means.

4. Fluid flow control means, comprising: conduit means for conducting fluid; a fluid pressure operable main valve connected with said conduit means; an automatic pressure differential operated pilot valve connected with said main valve including an element for controlling the exhaust of operating fluid from said main valve; flow restricting orifice means in said conduit means on the downstream side of said main valve, said pilot valve being connected with said conduit means to be operable in response to the differential pressure across said orifice means, said pilot valve being further connected with said conduit means at a selected pressure sensing point spaced from a discharge point of said conduit means, said orifice means presenting resistance to flow substantially matching the flow resistance in said conduit means between said pressure sensing point and said discharge point; and yieldable pressure means opposing the pressure derived from said pressure sensing point and acting in the same direction as said differential pressure across said orifice means.

5. Fluid flow control means, comprising: conduit means for conducting fluid; a pump connected in said conduit means; a fluid pressure operable pressure relief valve connected in by-passing relation to said pump for relieving excess pressure in said conduit means; and automatic pressure differential operated control means connected with said relief valve, said control means being operable to maintain a substantially constant pressure at the discharge end of said conduit means and including means responsive to the pressure at a selected pressure sensing point of said conduit means and to the differential pressure across a flow restriction in said conduit means spaced from said pressure sensing point.

6. Liquid flow control means, comprising: a storage tank; conduit means connected with said storage tank; a pump connected in said conduit means; a fluid pressure operable main valve connected in by-passing relation to said pump for returning excess liquid to said storage tank; and automatic pressure differential operated control means connected with said main valve including a fluid pressure operable element controlling the volume of operating fluid effective to actuate said main valve, and means for controlling said element in accordance with the pressure differential between (1) a pressure sensing point in said conduit means, located at a point spaced from the discharge end of said conduit means and beyond which point said conduit means offers a known resistance to flow at a given flow rate, and (2) the differential pressure across an orifice in said conduit means offering substantially the same resistance to flow at said flow rate as said known resistance in said conduit means.

7. Fluid flow control means, comprising: a storage tank; conduit means connected with said storage tank; a pump connected in said conduit means; a fluid pressure operable valve connected in by-passing relation to said pump for returning excess fluid to said storage tank; and automatic pressure differential operated control means connected with said valve for controlling the operation thereof, said control means including elements directly responsive to pressure conditions at more than two points in said conduit means and being operable to control said valve to maintain a substantially constant pressure at the discharge end of said conduit means irrespective of variations in demand.

8. Fluid flow control means, comprising: conduit means; a fluid pressure operable valve connected therewith and having a pressure chamber for operating fluid; flow restricting means connected in said conduit means on the downstream side of said valve; and automatic pressure differential operated control means connected with said valve for controlling the volume of operating fluid effective to actuate said valve, said control means being operable to control said valve to maintain a predetermined constant discharge pressure at a given discharge point of said conduit means, said control means including a fluid pressure operable element controlling the flow of operating fluid from the pressure chamber of said valve and normally being urged toward open position by a fixed force plus the pressure on the upstream side of said flow restricting means, said element normally being urged toward closed position by the pressure on the downstream side of said flow restricting means plus the pressure in said conduit means at a selected pressure sensing point.

9. In combination, conduit means; a main valve connected with said conduit means having an inlet chamber, a outlet chamber, a pressure chamber for operating fluid and a fluid pressure operable element subject to the pressure in said pressure chamber for controlling flow between said inlet and outlet chambers; an automatic pressure differential operated pilot valve having an inlet communicating with said inlet chamber and an outlet communicating with said outlet chamber; a conduit connecting the inlet side of said pilot valve with said pressure chamber, said pilot valve comprising a valve stem and a plurality of diaphragms connected with said valve stem and having pressure chambers associated therewith subject to different pressures in said conduit means, whereby said valve stem is operable to control the exhaust of operating fluid from said pressure chamber in accordance with the pressure differential acting upon said diaphragms; and means connecting said pressure chambers with said conduit means at different points on the downstream side of said main valve including a pressure sensing point adjacent the discharge end of said conduit means.

10. In combination, a pipe line; a fluid pressure operable main valve connected with said pipe line, said main valve having a pressure chamber for operating fluid; means connected in said pipe line on the downstream side of said main valve for restricting flow through said pipe line; a differential pressure operated pilot valve connected in by-passing relation with said main valve; means on the inlet side of said pilot valve connected with said pressure chamber, said pilot valve including an element operable to control the exhaust of operating fluid from the pressure chamber of said main valve, said pilot valve also including a plurality of diaphragms having pressure chambers cooperable therewith; conduit means establishing communication between the pressure chambers on the opposite sides of one of said diaphragms and said pipe line on opposite sides of said flow restricting means; additional conduit means establishing communication between another point of said pipe line and one of the pressure chambers at one side of another of said diaphragms; and pressure means effective upon the opposite side of said other diaphragm, whereby said main valve is controlled in accordance with the differential of all of said pressures acting upon said pilot valve.

11. Fluid flow control means, comprising: conduit means; a fluid pressure operable valve connected therewith and having a pressure chamber for operating fluid; flow-restricting means connected in said conduit means on the downstream side of said valve; automatic pressure differential operated control means connected with said valve for controlling the volume of operating fluid effective to actuate said valve, said control means being operable to control said valve to maintain a predetermined constant discharge pressure at a given discharge point of said conduit means, said control means including a fluid pressure operable element controlling the flow of operating fluid from the pressure chamber of said valve and normally being urged toward closed position by a fixed force plus the pressure on the upstream side of said flow-restricting means, said element normally being urged toward open position by the pressure on the downstream side of said flow-restricting means plus the pressure in said conduit means at a selected pressure sensing point.

12. Fluid flow control means, comprising: a pipe line; a fluid pressure operable main valve connected in said pipe line and having an inlet chamber, an outlet chamber, a pressure chamber for operating fluid, and a fluid pressure operable element for controlling flow between said inlet and outlet chambers; an automatic pressure differential operated pilot valve including a body having an inlet, an outlet and a pressure-responsive member for controlling flow therebetween, said pilot valve including a first diaphragm connected with said pressure-responsive member and having a pressure chamber on the upper and lower sides of said first diaphragm, said pilot valve also including a second diaphragm connected with said pressure-responsive member and having a pressure chamber on the lower side of said second diaphragm and means acting to exert a predetermined force on the upper side of said second diaphragm; means connecting said pilot valve in by-passing relation with said main valve; means connecting the inlet side of said pilot valve with said pressure chamber of said main valve; an orifice plate connected in said pipe line on the outlet side of said main valve; conduit means having one end thereof connected with said pipe line on the upstream and downstream sides of said orifice plates, respectively, and having the opposite ends thereof connected with the chambers on the upper and lower sides, respectively, of said first diaphragm; and a conduit having one end thereof connected to said pipe line at a selected pressure sensing point on the upstream side of a zone of discharge of liquid conducted by said pipe line and having its opposite end connected with the chamber at the lower side of said second diaphragm, said orifice providing a flow-resistance in said pipe line which is substantially equal to the flow resistance between said pressure sensing point and the point of fluid discharge, whereby said pilot will control said main valve to maintain a substantially constant pressure at the point of fluid discharge.

13. Fluid flow control means, comprising: a pipe line; a fluid pressure operable main valve connected in said pipe line and having an inlet chamber, an outlet chamber, a pressure chamber for operating fluid, and a fluid pressure operable element for controlling flow between said inlet and outlet chambers; an automatic pressure differential operated pilot valve including a body having an inlet, an outlet and a pressure-responsive member for controlling flow therebetween, said pilot valve including a first diaphragm connected with said pressure-responsive member and having a pressure chamber in the upper and lower sides of said first diaphragm, said pilot valve also including a second diaphragm connected with said pressure-responsive member and having a pressure chamber on the lower side of said second diaphragm and means acting to exert a predetermined force on the upper side of said second diaphragm; means connecting said pilot valve in by-passing relation with said main valve; means including a flow restricting orifice connecting the inlet side of said pilot valve with said pressure chamber of said main valve to control the rate of supply of operating fluid thereto; an orifice plate connected in said pipe line on the outlet side of said main valve; conduit means having one end thereof connected with said pipe line on the upstream and downstream sides of said orifice plate, respectively, and having the opposite ends thereof connected with the chambers on the upper and lower sides, respectively, of said first diaphragm; and a conduit having one end thereof connected to said pipe line at a selected pressure sensing point on the upstream side of a zone of discharge of liquid conducted by said pipe line and having its opposite end connected with the chamber at the lower side of said second diaphragm, said orifice providing a flow resistance in said pipe line which is substantially equal to the flow resistance between said pressure sensing point and the point of fluid discharge, whereby said pilot will control said main valve to maintain a substantially constant pressure at the point of fluid discharge.

14. Fluid flow control means, comprising: a pipe line; a fluid pressure operable main valve connected in said pipe line and having an inlet chamber, an outlet chamber, a pressure chamber for operating fluid, and a fluid pressure operable element for controlling flow between said inlet and outlet chambers; an automatic pressure differential operated pilot valve including a body having an inlet, an outlet and a pressure-responsive member for controlling flow therebetween, said pilot valve including a first diaphragm connected with said pressure-responsive member and having a pressure chamber on the upper and lower sides of said first diaphragm, said pilot valve also including a second diaphragm connected with said pressure-responsive member and having a pressure chamber on the lower side of said second diaphragm and a compression spring acting on the upper side of said second diaphragm; means connecting said pilot valve in by-passing relation with said main valve; means connecting the inlet side of said pilot valve with said pressure chamber of said main valve; an orifice plate connected in said pipe line on the outlet side of said main valve; conduit means having one end thereof connected with said pipe line on the upstream and downstream sides of said orifice plate, respectively, and having the opposite ends thereof connected with the chambers on the upper and lower sides, respectively, of said first diaphragm; a conduit having one end thereof connected to said pipe line at a selected pressure sensing point on the upstream side of a zone of discharge of liquid conducted by said pipe line and having its opposite end connected with the chamber at the lower side of said second diaphragm; said spring exerting a force on the upper side of said second diaphragm substantially equal to the unit pressure desired at said discharge zone, said orifice providing a unit pressure flow resistance in said pipe line which is substantially equal to the unit pressure flow resistance between said pressure sensing point and the point of fluid discharge, whereby said pilot will control said main valve to maintain a substantially constant pressure at the point of fluid discharge.

15. In combination, a pipe line; a main valve connected in said pipe line having an inlet chamber, an outlet chamber, diaphragm means for controlling flow between said chambers, and a pressure chamber for operating fluid to effect actuation of said diaphragm; an automatic pressure differential operating pilot valve including a body having an inlet, an outlet and a pressure-responsive member for controlling flow therebetween; means connecting said pilot valve in by-passing relation with said main valve; conduit means having one end thereof communicating with said by-pass means on the inlet side of said pilot valve and having its opposite end communicating with the pressure chamber of said main valve; means for effecting actuation of said pilot valve in accordance with pressure conditions in said pipe line; an ejector connected in by-passing relation with said main valve and including a diaphragm for controlling the operation thereof, one side of said diaphragm being subject to the pressure in said inlet chamber of said main valve for normally maintaining said ejector inactive; a manually operable pilot valve having a pressure chamber subject to the pressure on the inlet side of said main valve and being operable to direct fluid to said ejector for effecting actuation of said ejector diaphragm to its operative position to place said ejector in action.

16. Liquid-flow control means, comprising: a liquid storage tank; a pump having an inlet connected with said storage tank; a delivery hose having an inlet communicating with an outlet of said pump; a by-pass pipe having one end communicating with said pump outlet at a point ahead of said hose inlet and having its opposite end communicating with said storage tank; a fluid pressure operable valve connected in said by-pass pipe; and fluid pressure operated control means connected with said valve operable to control said valve to maintain a substantially constant unit discharge pressure at the discharge end of said delivery hose.

17. Liquid-flow control means, comprising: a liquid storage tank; a conduit connected with said storage tank; a pump connected in said conduit; a delivery hose having an inlet communicating with said conduit on the outlet side of said pump; a by-pass pipe having one end communicating with said conduit at a point ahead of said delivery hose and having its opposite end communicating with said storage tank; a fluid pressure operable valve connected in said by-pass pipe; an ejector connected in by-passing relation with said valve and having a suction opening connected by a return pipe with said conduit at a point beyond the connection of said by-pass line thereto but ahead of said delivery hose; means in said conduit operable to cause liquid discharged from said pump to flow through said by-pass pipe; and manually operable means for controlling the operation of said ejector to effect evacuation of said hose line.

18. Liquid-flow control means, comprising: a liquid storage tank; a pump having an inlet connected with said storage tank; a filter having an inlet connected with an outlet of said pump; a meter having an inlet communicating with an outlet of said filter; a delivery hose having an inlet communicating with an outlet of said meter; a by-pass pipe having one end communicating with said pump outlet at a point ahead of said filter and having its opposite end communicating with said storage tank; a fluid pressure operable valve connected in said by-pass pipe; a hydraulically controlled ejector connected in by-passing relation with said valve and having a suction opening connected by a conduit with said pump at a point beyond the connection of said by-pass line thereto but ahead of said filter; means between said by-pass line and said last-mentioned point operable to cause liquid discharged from said pump to flow through said by-pass pipe; and manually operable pilot valve means for controlling the operation of said ejector to effect evacuation of said hose line.

19. Liquid-flow control means, comprising: a storage tank; a pipe line having one end thereof connected with said storage tank and having connected therein in the following order, a pump, a shut-off valve, and a delivery hose; a by-pass pipe having one end connected with said pipe line at a point between said pump and said shut-off valve and having its opposite end connected with said storage tank; a fluid pressure operated by-pass valve connected in said by-pass line, said by-pass valve having an inlet chamber, an outlet chamber, a pressure chamber for operating fluid, and fluid pressure operable means for controlling flow between said inlet and outlet chambers; an automatic pressure differential operated pilot valve having an inlet communicating with the inlet of said main valve, an outlet communicating with the outlet of said main valve and a pressure-responsive member for controlling flow therebetween, said pilot valve including a first diaphragm connected with said pressure-responsive member and having a pressure chamber on the upper and lower sides of said first diaphragm, said pilot valve also including a second diaphragm connected with said pressure-responsive member and having a pressure chamber on the lower side of said second diaphragm and a pressure means acting on the upper side of said second diaphragm; means connecting the inlet side of said pilot valve with said pressure chamber of said main valve, whereby said pilot valve can control the supply and exhaust of operating fluid to the pressure chamber of said main valve; orifice means connected in said pipe line on the outlet side of said main valve; conduit means having one end thereof connected with said pipe line on the upstream and downstream sides of said orifice plate, respectively, and having the opposite ends thereof connected with the chambers on the upper and lower sides, respectively, of said first diaphragm; conduit means having one end thereof connected to said pipe line at a pressure sensing point between said shut-off valve and said delivery hose and having its opposite end connected with the chamber at the lower side of said second diaphragm, said pressure means exerting a force on said pressure-responsive member substantially equal to the pressure desired at said discharge point, said orifice providing a flow resistance in said pipe line which is substantially equal to the flow resistance between said pressure sensing point and the discharge end of said delivery hose, whereby said pilot valve will control said main valve to by-pass fluid from said pipe line back to said storage tank in accordance with fluctuations in the demand from said discharge hose to thereby maintain a substantially constant unit pressure at the point of discharge from said delivery hose.

20. Liquid-flow control means, comprising: a storage tank; a pipe line having one end thereof connected with said storage tank and having connected therein, in the following order, a pump, a shut-off valve, a filter, a meter, and a delivery hose; a by-pass pipe having one end connected with said pipe line at a point between said pump and said shut-off valve and having its opposite end connected with said storage tank; a fluid pressure operated by-pass valve connected in said by-pass line, said by-pass valve having an inlet chamber, an outlet chamber, a pressure chamber for operating fluid, and fluid pressure operable means for controlling flow between said inlet and outlet chambers; an automatic pressure differential operated pilot valve having an inlet communicating with the inlet of said main valve, an outlet communicating with the outlet of said main valve and a pressure-responsive member for controlling flow therebetween, said pilot valve including a first diaphragm connected with said pressure-responsive member and having a pressure chamber on the upper and lower sides of said first diaphragm, said pilot valve also including a second diaphragm connected with said pressure-responsive member and having a pressure chamber on the lower side of said second diaphragm and a compression spring acting on the upper side of said second diaphragm; means connecting the inlet side of said pilot valve with said pressure chamber of said main valve, whereby said pilot valve can control the supply and exhaust of operating fluid to the pressure chamber of said main valve; an orifice plate connected in said pipe line on the outlet side of said main valve; conduit means having one end thereof connected with said pipe line on the upstream and downstream sides of said orifice plate, respectively, and having the opposite ends thereof connected with the chambers on the upper and lower sides, respectively, of said first diaphragm; conduit means having one end thereof connected to said pipe line at a point between said meter and said delivery hose and having its opposite end connected with the chamber at the lower side of said second diaphragm, said spring exerting a force on said pressure-responsive member substantially equal to the pressure desired at said discharge point, said orifice providing a flow resistance in said pipe line which is substantially equal to the flow resistance between said pressure sensing point and the discharge end of said delivery hose, whereby said pilot valve will control said main valve to by-pass fluid from said pipe line back to said storage tank in accordance with fluctuations in the demand from said discharge hose to thereby maintain a substantially constant unit pressure at the point of discharge from said delivery hose.

21. Liquid-flow control means, comprising: a pipe line; a pump connected in said pipe line; a by-pass line for by-passing liquid pumped by said pump; a fluid pressure operable by-pass valve connected in said by-pass line and having a chamber for operating fluid, said by-pass valve including an element for controlling flow therethrough, actuatable to closed position by operating fluid under pressure; and means including a conduit for establishing communication between said pressure chamber and said pipe line at a point ahead of said pump, whereby said pump can aid in withdrawing operating fluid from said pressure chamber to effect quick opening of said by-pass valve.

22. Liquid-flow control means, comprising: a storage tank; a discharge pipe line connected with said storage tank; a pump connected in said pipe line; a by-pass line for conducting liquid pumped by said pump back to said storage tank; a fluid pressure operable by-pass valve connected in said by-pass line and having a chamber for operating fluid; means including a conduit for establishing communication between said pressure chamber and said pipe line at a point ahead of said pump, whereby said pump can aid in withdrawing operating fluid from said pressure chamber to effect quick opening of said by-pass valve; and a branch pipe connected with said last-mentioned conduit adapted to be connected with a source of liquid supply, whereby said pump can draw liquid through said branch pipe and pump it through said by-pass line into said storage tank to refill said tank.

23. An ejector, comprising: an elongated housing having a chamber intermediate the ends thereof forming a Venturi throat; a nozzle slidably mounted in said housing and having the discharge end thereof extending into said chamber, said nozzle having a Venturi passage serving to provide a primary jet; means for admitting ejector operating fluid into said nozzle; a diaphragm operatively connected with the opposite end of said nozzle, said housing having a Venturi passage axially aligned with said nozzle serving to provide a secondary jet, and having an outlet opening communicating therewith for the discharge of fluid from the ejector; a valve seat formed at the entrance end of said last-mentioned Venturi passage adapted to be engaged by said nozzle to discontinue operation of the ejector; and means for applying pressure to said diaphragm for effecting movement of said nozzle into engagement with said seat.

24. An ejector, comprising: an elongated housing having a diaphragm at one end thereof and provided with a pressure chamber at each side of said diaphragm; a movable nozzle in said housing connected with said diaphragm, said nozzle having a longitudinally extending primary Venturi passage formed therein and at least one lateral opening establishing communication between said primary Venturi passage and the pressure chamber at one side of said diaphragm, said ejector having means for admitting ejector operating fluid into said one chamber, said housing also having a secondary Venturi passage spaced from but in axial alignment with said nozzle and having a seat at one end thereof engageable by said nozzle and having a discharge opening at the opposite end thereof, said housing also having a throat between the adjacent ends of said Venturi passages in which a vacuum condition is to be created; and means for admitting fluid under pressure into the chamber on the other side of said diaphragm for effecting movement of said nozzle into engagement with said seat to thereby terminate the operation of the ejector.

25. An ejector, comprising: an elongated housing having a diaphragm at one end thereof and provided with a first chamber on one side of said diaphragm and a second chamber on the opposite side of said diaphragm, said housing having a third chamber intermediate the ends thereof forming a Venturi throat; a nozzle slidably mounted in said housing and having one end thereof extending into said first chamber and connected with said diaphragm and having its opposite end projecting into said throat-forming chamber, said nozzle having a Venturi passage communicating with said one chamber serving to provide a primary jet, said housing further having an opening for admitting ejector operating fluid into said first chamber, said housing further having a Venturi passage axially aligned with said nozzle and serving to provide a secondary jet and terminating at one end thereof in an outlet for the discharge of fluid from the ejector; a valve seat formed at the opposite end of said last-mentioned passage adapted to be engaged by said nozzle to discontinue operation of the ejector; and means for establishing pressure in said second chamber effective upon said diaphragm for moving said nozzle into engagement with said seat.

26. An ejector, comprising: an elongated housing hava diaphragm at one end thereof and being provided with a first chamber at one side of said diaphragm and a second chamber at the opposite side of said diaphragm, said housing having a third chamber longitudinally spaced from said first chamber and forming a Venturi throat; a nozzle slidably mounted in said housing and having one end thereof connected with said diaphragm and its opposite end extending into said throat, said nozzle having a first Venturi passage and having at least one opening establishing communication between said first chamber and said first Venturi passage, said housing having an opening communicating with said first chamber for admitting operating fluid into said nozzle, said housing also having a second Venturi passage axially aligned with said nozzle and having one end thereof communicating with said throat and its opposite end communicating with an outlet for the discharge of fluid from the housing; a valve seat formed at the throat end of said second Venturi passage adapted to be engaged by said nozzle to discontinue operation of the ejector; and means for admitting fluid under pressure into said second chamber for effecting movement of said nozzle into engagement with said seat.

27. An ejector, comprising: an elongated housing having a diaphragm at one end thereof and being provided with a first chamber at one side of said diaphragm and a second chamber at the opposite side of said diaphragm, said housing having a Venturi throat separated from said first chamber by a partition; a nozzle slidably mounted in said partition and having one end thereof connected with said diaphragm and its opposite end extending into said throat, said nozzle having a Venturi passage and at least one opening establishing communication between said first chamber and said Venturi passage, said housing having an inlet communicating with said first chamber for admitting operating fluid into said first chamber for effecting actuation of said diaphragm to move said nozzle in a direction away from said throat, at least said one opening being located in said nozzle so that when the nozzle is in its retracted position said opening is located in said first chamber adjacent said partition, whereby when said nozzle is retracted fluid admitted into said first chamber can flow through said opening into said nozzle to form a primary jet, said housing having a Venturi passage axially aligned with said nozzle and having one end thereof communicating with said throat and its opposite end communicating with an outlet for the discharge of fluid from the housing; and means for admitting fluid under pressure into said second chamber for effecting movement of said nozzle into a position in which said lateral opening is within said partition and out of communication with said first chamber so that the flow of operating fluid through said nozzle is thereby interrupted and operation of the ejector is thus discontinued.

28. Liquid flow control means as defined in claim 18, in which the means for causing liquid discharged from the pump to flow through the by-pass pipe comprises a fluid pressure operated valve disposed between the by-pass pipe and the conduit leading to the ejector, and in which the manually operable pilot valve means is connected with said fluid pressure operated valve to automatically effect closing thereof when the ejector is rendered active to evacuate the hoseline.

29. A fluid flow control means as defined in claim 12, in which the orifice plate is connected in the pipe line between two spaced pipe sections and includes a flange extending into the space between the pipe sections; and further embodies means including a split coupling securing the pipe sections together to retain the orifice plate in position therebetween.

30. The combination defined in claim 15, wherein the ejector includes a housing having a chamber forming a Venturi throat; a nozzle slidably mounted in the housing and having a discharge end engageable with a seat in said housing to render the ejector inactive; and wherein the diaphragm is connected with the opposite end of said nozzle for actuating said nozzle.

References Cited in the file of this patent

UNITED STATES PATENTS

| | | |
|---|---|---|
| 1,280,477 | Hopkins | Oct. 1, 1918 |
| 1,787,686 | Kerr | Jan. 6, 1931 |
| 1,899,396 | Ray | Feb. 28, 1933 |
| 1,957,398 | Wallace | May 1, 1934 |
| 2,013,431 | Bechtold | Sept. 3, 1935 |
| 2,018,119 | Brouse | Oct. 22, 1935 |
| 2,072,531 | Richardson | Mar. 2, 1937 |
| 2,112,290 | Holland | Mar. 29, 1938 |

(References on following page)

UNITED STATES PATENTS

| | | | |
|---|---|---|---|
| 2,276,839 | Grise | Mar. 17, | 1942 |
| 2,291,731 | Lake et al. | Aug. 4, | 1942 |
| 2,362,559 | Jauch et al. | Nov. 14, | 1944 |
| 2,365,713 | MacLean et al. | Dec. 26, | 1944 |
| 2,433,973 | Anderson | Jan. 6, | 1948 |
| 2,443,146 | Pyles | June 8, | 1948 |
| 2,445,540 | Smillie | July 20, | 1948 |
| 2,448,071 | Anderson | Aug. 31, | 1948 |
| 2,507,597 | Holdridge | May 16, | 1950 |
| 2,514,514 | Puster | July 11, | 1950 |
| 2,525,256 | Byram | Oct. 10, | 1950 |
| 2,537,266 | Granberg | Jan. 9, | 1951 |
| 2,574,823 | Fulkerson | Nov. 13, | 1951 |
| 2,649,107 | Avery | Aug. 18, | 1953 |
| 2,747,598 | Wooldridge | May 29, | 1956 |